(12) United States Patent
Achor

(10) Patent No.: US 7,847,457 B2
(45) Date of Patent: Dec. 7, 2010

(54) BLDC MOTOR ASSEMBLY

(75) Inventor: Kyle D. Achor, Monticello, IN (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 516 days.

(21) Appl. No.: 11/746,086

(22) Filed: May 9, 2007

(65) Prior Publication Data

US 2008/0278018 A1    Nov. 13, 2008

(51) Int. Cl.
H02K 21/12    (2006.01)
(52) U.S. Cl. .............................. 310/156.12; 310/68 R; 310/89; 310/254.1; 29/596
(58) Field of Classification Search ................................ 310/156.05–156.12, 156.28–156.29, 261, 310/43; 29/596–598, 609.1
See application file for complete search history.

(56) References Cited

U.S. PATENT DOCUMENTS

| | | | |
|---|---|---|---|
| 3,571,921 A | 3/1971 | Pieper | |
| 3,604,737 A | 9/1971 | Tarpey | |
| 4,169,990 A * | 10/1979 | Lerdman | 318/400.41 |
| 4,403,164 A | 9/1983 | Preece | |
| 4,404,483 A | 9/1983 | Lebkuchner | |
| 4,625,135 A | 11/1986 | Kasabian | |
| 4,955,790 A | 9/1990 | Nakanishi et al. | |
| 4,978,282 A | 12/1990 | Fu et al. | |
| 4,998,865 A | 3/1991 | Nakanishi et al. | |
| 5,007,806 A | 4/1991 | Bellis et al. | |
| 5,015,159 A | 5/1991 | Mine et al. | |
| 5,040,286 A | 8/1991 | Stark | |
| 5,040,954 A | 8/1991 | Iwai | |
| 5,041,749 A | 8/1991 | Gaser et al. | |
| 5,053,664 A | 10/1991 | Kikuta et al. | |
| 5,072,145 A | 12/1991 | Davis et al. | |
| 5,092,748 A | 3/1992 | Simmons, II | |
| 5,096,390 A | 3/1992 | Sevrain et al. | |
| 5,120,201 A | 6/1992 | Tuckey et al. | |
| 5,144,735 A | 9/1992 | Stark | |
| 5,148,792 A | 9/1992 | Tuckey | |
| 5,231,967 A | 8/1993 | Baltz et al. | |
| 5,278,468 A | 1/1994 | Escaravage et al. | |
| 5,319,844 A | 6/1994 | Huang et al. | |
| 5,327,064 A | 7/1994 | Arakawa et al. | |
| 5,338,163 A | 8/1994 | Frank et al. | |

(Continued)

FOREIGN PATENT DOCUMENTS

JP    62018960 A    1/1987

(Continued)

*Primary Examiner*—Minh Trinh
(74) *Attorney, Agent, or Firm*—Robert L. Stearns; Dickinson Wright, PLLC

(57) ABSTRACT

A BLDC electric motor assembly (24) includes a rotor (42) having a plurality of magnet segments (50) securely retained thereabout by an annular ring (68) which is shrunk in situ in an electromagnetic forming operation. The magnet segments (50) are formed with tongues (62, 64) on their upper and lower ends (56, 58). One tongue (64) seats in a retaining pocket (48) molded on the rotor shaft (40), whereas the other tongue (62) provides a ledge into which the ring (68) seats. After the magnet forming operation, wherein the ring (68) is shrunk, the outer surface of the ring (68) is flush with the outer surfaces (54) of the magnet segments (50).

10 Claims, 6 Drawing Sheets

U.S. PATENT DOCUMENTS

| | | | |
|---|---|---|---|
| 5,345,124 A | 9/1994 | Lang | |
| 5,353,491 A | 10/1994 | Gentry | |
| 5,356,272 A | 10/1994 | Nagata et al. | |
| 5,368,805 A | 11/1994 | Motai | |
| 5,375,975 A | 12/1994 | Yu et al. | |
| 5,393,206 A | 2/1995 | Roth et al. | |
| 5,399,075 A | 3/1995 | Frank et al. | |
| 5,418,416 A | 5/1995 | Muller | |
| 5,420,752 A | 5/1995 | Variot | |
| 5,421,706 A | 6/1995 | Martin, Sr. | |
| 5,454,697 A | 10/1995 | Nakanishi | |
| 5,462,622 A | 10/1995 | Small et al. | |
| 5,487,650 A | 1/1996 | Gaston et al. | |
| 5,563,463 A | 10/1996 | Stark | |
| 5,570,272 A | 10/1996 | Variot | |
| 5,593,287 A | 1/1997 | Sadakata et al. | |
| 5,613,844 A | 3/1997 | Tuckey et al. | |
| 5,648,694 A | 7/1997 | Kobayashi et al. | |
| 5,661,894 A | 9/1997 | Kawasaki et al. | |
| 5,695,471 A | 12/1997 | Wampler | |
| 5,697,769 A | 12/1997 | Kobman et al. | |
| 5,782,223 A | 7/1998 | Yamashita et al. | |
| 5,785,013 A | 7/1998 | Sinn et al. | |
| 5,788,210 A | 8/1998 | Mimura | |
| 5,810,568 A | 9/1998 | Whitefield et al. | |
| 5,813,264 A | 9/1998 | Steingroever | |
| 5,908,286 A | 6/1999 | Clemmons | |
| 5,920,437 A | 7/1999 | Shirotori | |
| 5,939,807 A | 8/1999 | Patyk et al. | |
| 5,945,766 A | 8/1999 | Kim et al. | |
| 5,949,171 A | 9/1999 | Horski et al. | |
| 5,960,775 A | 10/1999 | Tuckey | |
| 5,961,293 A | 10/1999 | Clemmons et al. | |
| 5,981,921 A | 11/1999 | Yablochnikov | |
| 5,997,262 A | 12/1999 | Finkbeiner et al. | |
| 6,025,665 A | 2/2000 | Poag et al. | |
| 6,028,386 A | 2/2000 | Kech et al. | |
| 6,063,321 A | 5/2000 | Koyama et al. | |
| 6,068,454 A | 5/2000 | Gaston et al. | |
| 6,099,325 A | 8/2000 | Parkhill | |
| 6,102,011 A | 8/2000 | Meyer et al. | |
| 6,106,240 A | 8/2000 | Fischer et al. | |
| 6,124,775 A | 9/2000 | Linkner, Jr. | |
| 6,129,524 A | 10/2000 | Woollenweber et al. | |
| 6,132,184 A | 10/2000 | Robertson et al. | |
| 6,135,730 A | 10/2000 | Yoshioka | |
| 6,149,404 A | 11/2000 | Dobler et al. | |
| 6,161,274 A | 12/2000 | Stark et al. | |
| 6,166,468 A | 12/2000 | Suzuki et al. | |
| 6,177,741 B1 | 1/2001 | Lutkenhaus et al. | |
| 6,179,579 B1 | 1/2001 | Dobler et al. | |
| 6,198,189 B1 | 3/2001 | Takahashi et al. | |
| 6,205,644 B1 | 3/2001 | Daniels et al. | |
| 6,213,734 B1 | 4/2001 | Imhof et al. | |
| 6,231,318 B1 | 5/2001 | Cotton et al. | |
| 6,296,458 B1 | 10/2001 | Zacher et al. | |
| 6,300,169 B1 | 10/2001 | Weiblen et al. | |
| 6,326,748 B1 | 12/2001 | Moroto et al. | |
| 6,333,576 B1 | 12/2001 | Ishikawa et al. | |
| 6,375,381 B1 | 4/2002 | Ruschke et al. | |
| 6,379,254 B1 | 4/2002 | Yablochnikov | |
| 6,443,716 B1 | 9/2002 | Yoshioka | |
| 6,531,688 B2 | 3/2003 | Yablochnikov | |
| 6,543,746 B2 | 4/2003 | Bircann et al. | |
| 6,556,645 B2 | 4/2003 | Kim | |
| 6,616,429 B1 | 9/2003 | Weber et al. | |
| 6,652,249 B2 | 11/2003 | Kenney et al. | |
| 6,659,737 B2 | 12/2003 | Bader et al. | |
| 6,703,594 B2 | 3/2004 | Yablochnikov | |
| 6,712,585 B2 * | 3/2004 | Iehl et al. | 417/42 |
| 6,722,794 B2 | 4/2004 | Mesaki et al. | |
| 6,734,589 B2 | 5/2004 | Kogure et al. | |
| 6,734,596 B1 | 5/2004 | Liao | |
| 6,735,858 B1 | 5/2004 | Schmidt | |
| 6,821,110 B2 | 11/2004 | Carlson et al. | |
| 6,844,647 B2 * | 1/2005 | Horber | 310/156.43 |
| 6,891,137 B2 | 5/2005 | Yablochnikov | |
| 6,918,380 B2 | 7/2005 | Nomura | |
| 6,965,183 B2 | 11/2005 | Dooley | |
| 6,986,648 B2 | 1/2006 | Williams | |
| 7,057,318 B2 | 6/2006 | Strobl et al. | |
| 7,080,787 B2 | 7/2006 | Wulff et al. | |
| 7,084,544 B2 | 8/2006 | Park et al. | |
| 7,097,433 B2 | 8/2006 | Struthers et al. | |
| 7,186,308 B2 | 3/2007 | Metcalf et al. | |
| 7,215,052 B2 | 5/2007 | Blase et al. | |
| 7,356,906 B2 * | 4/2008 | Kim et al. | 29/596 |
| 7,394,174 B2 | 7/2008 | Blase et al. | |
| 2001/0033111 A1 | 10/2001 | Choi | |
| 2004/0081566 A1 | 4/2004 | Bader et al. | |
| 2004/0239202 A1 | 12/2004 | Dooley | |
| 2005/0000726 A1 | 1/2005 | Kimata et al. | |
| 2005/0214135 A1 | 9/2005 | Shibuya et al. | |
| 2007/0107475 A1 | 5/2007 | Hill | |

FOREIGN PATENT DOCUMENTS

| | | | |
|---|---|---|---|
| JP | 2007221955 A | 8/2007 | |

* cited by examiner

BLDC MOTOR ASSEMBLY

CROSS REFERENCE TO RELATED APPLICATIONS

None.

BACKGROUND OF THE INVENTION

1. Field of the Invention

This invention relates generally to a brushless direct current (BLDC) motor assembly, and more particularly toward an improved method and structure for attaching permanent magnet segments on a rotor of the BLDC motor assembly.

2. Related Art

With the introduction of electronic control systems for electric motors, the industry objectives of long life, efficiency, reliability and low EM interference have become achievable. This is, in part, due to the advent of brushless direct current (BLDC) motor technology.

BLDC motor assemblies include a rotor assembly which is disposed for powered rotation within a stator in response to an electromagnetic field generated by the stator. The rotor of a BLDC motor includes a plurality of magnetic segments arrayed in equal arcuate increments about its exterior surface. Typical examples include 4 magnetic segments, each spanning approximately 90° of the rotor circumference. Such magnet segments may be of the so-called neo-magnet type.

Typically, the magnet segments are coated with a thin layer of protective material and then affixed to an underlying hub section of the rotor using a bonding adhesive. In circumstances where the coating material is not securely adhered to the magnet segment, delamination can occur during operation. This catastrophic failure of magnet separation from the underlying hub surface can lead to motor damage.

The prior art has suggested techniques other than adhesive for retaining magnet segments to the rotor in a BLDC motor assembly. For example, U.S. Pat. No. 5,563,636 to Stark, issued Oct. 8, 1996, discloses a rotor assembly wherein magnet segments are secured in their operative position upon the rotor using a sleeve-like shell. However, a shell of this type adds undesirable weight, expense and complexity to the motor assembly.

Other examples of prior art attempts to securely attach magnet segments to a permanent magnet type rotor include U.S. Pat. No. 4,625,135 to Kasabian, issued Nov. 25, 1986. In this example, the permanent magnet segments are affixed with threaded fasteners. Again, a technique such as this contributes substantially to the manufacturing assembly time, and provides additional failure modes for the motor assembly, as well as adding substantially to the component complexities.

Accordingly, there is a need for an improved method and design for attaching permanent magnet segments into an operative array on a rotor for a brushless direct current electric motor assembly which is strong, light weight, and efficiently accomplished in high-volume production settings.

SUMMARY OF THE INVENTION

The subject invention contemplates a method for attaching permanent magnet segments into an operative array on a rotor for a brushless direct current (BLDC) electric motor assembly of the type used in liquid fuel pumps and the like. The method comprises the steps of providing a rotary shaft having a hub section with an outer surface, providing a plurality of permanent magnet segments, each magnet segment having opposing ends, and supporting the magnet segments in an operative position on the outer surface of the hub section. The step of supporting the magnet segments includes arranging the magnet segments side-by-side in equal arcuate increments around the outer surface of the hub. The method further includes fabricating an annular ring from an electrically conductive material and loosely encircling at least one end of the supported magnet segments with the ring. The invention is characterized by the step of rapidly shrinking the ring by inducing therein a powerful current flow using a high energy pulsed magnetic field to squeeze each of the magnet segments into tight pressing engagement against the outer surface of the hub and thereby collectively hold the magnet segments in the operative position upon the rotary shaft. In this manner, the retention of the magnet segments on the hub is accomplished using a method which is reliable, inexpensive, and efficiently carried out in high production environments.

The invention also contemplates a BLDC electric motor assembly of the type used in liquid fuel pumps and the like. The motor assembly comprises a stator for producing a controlled electromagnetic field. The stator defines a central longitudinal axis of the motor assembly. A shaft is supported for rotation about the longitudinal axis, and includes a hub section having an outer surface. A plurality of permanent magnet segments are supported on the outer surface of the hub for rotation with the shaft. Each magnet segment has opposite, longitudinally spaced ends. The magnet segments are arranged side-by-side in equal arcuate increments around the hub. The motor assembly is characterized by an annular ring encircling at least one of the ends of the arrayed plurality of magnet segments, the ring having been deformed in an electromagnetic forming operation so as to exert a generally uniform compression on each of the magnet segments to hold the magnet segments in an operative position around the hub. The ring thus formed operates to retain the magnet segments on the hub in a reliable, inexpensive manner which is efficiently carried out in high production environments.

Furthermore, the invention contemplates a permanent magnet segment of the type used in an array of magnet segments supported on a rotor in a BLDC electric motor assembly. The magnet segment comprises an inner surface, a convex, semi-cylindrical outer surface, an upper end, a lower end, and opposing, general parallel side edges respectively extending between the upper and lower ends. The magnet segment of this invention is characterized by a first tongue adjacent one end of the upper and lower ends for receiving an annular ring to be subsequently deformed in an electromagnetic forming operation so as to exert a generally uniform compression on the magnet segment to hold the magnet segment in its operative position upon the rotor.

A motor assembly made in accordance with this invention overcomes all of the shortcomings and disadvantages characteristic of the various prior art attempts to securely, reliably and inexpensively form a rotor assembly for a BLDC electric motor.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
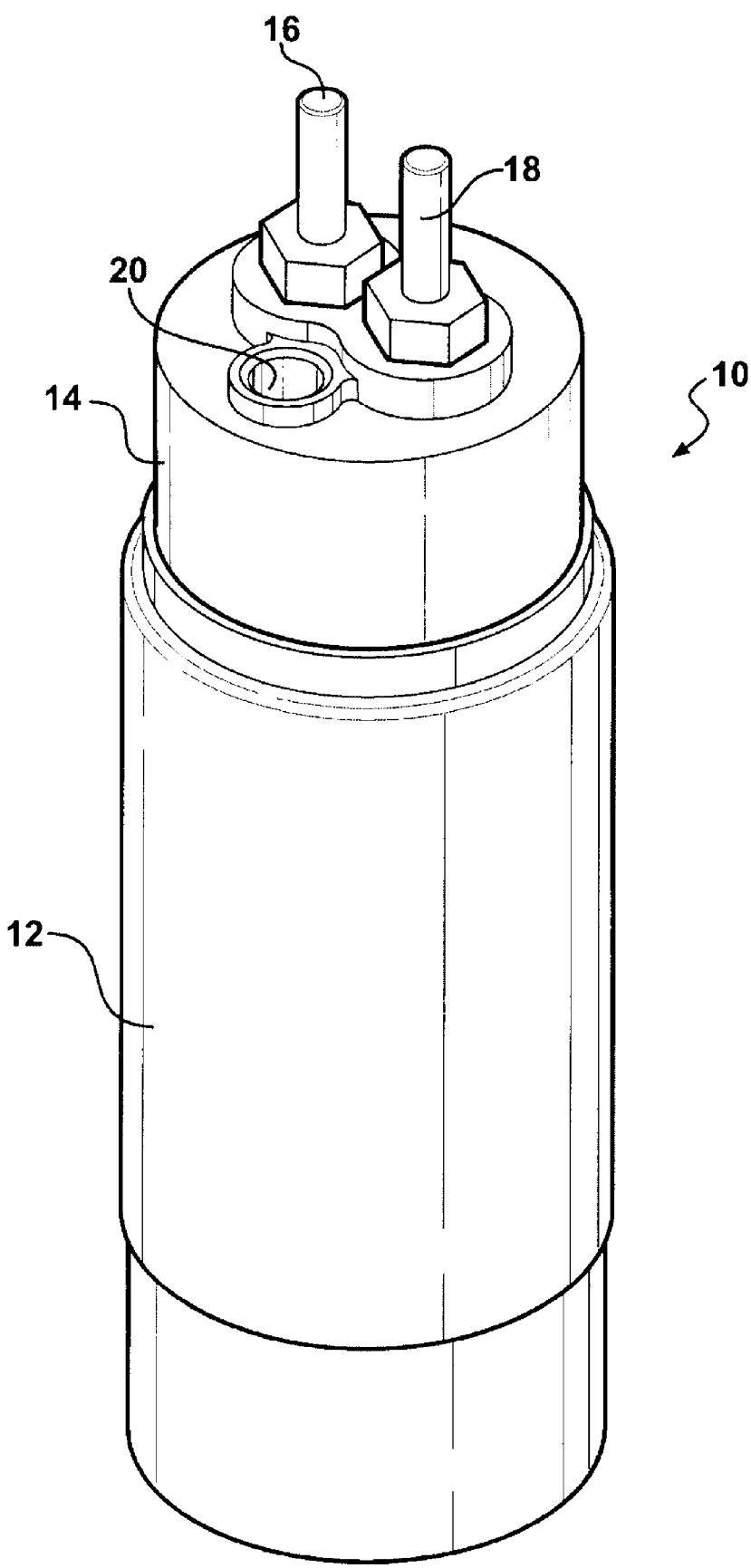
FIG. 1 is a perspective view of an exemplary liquid fuel pump.

Referring to the Figures, wherein like numerals indicate like or corresponding parts throughout the several views, in a liquid fuel pump is generally shown at 10 in FIG. 1. The fuel pump 10 is of the type used in vehicular applications for fuel that is transferred from a storage tank to an internal combustion engine. However, the pump 10 may be used for other purposes than transferring fuel, and indeed the novel aspects of the invention as relating to the BLDC motor assembly can be used fully apart from and without any reference to the fuel pump 10 or any pump assembly per say. The fuel pump 10 is shown including a sleeve-like housing 12 having a generally cylindrical configuration. An outlet cap 14 encloses the upper end of the housing 12 and provides an interface for electrical connections via terminals 16, 18 as well as a fuel outlet port 20 into which a fuel delivery coupling (not shown) can be attached.

Figure 2:
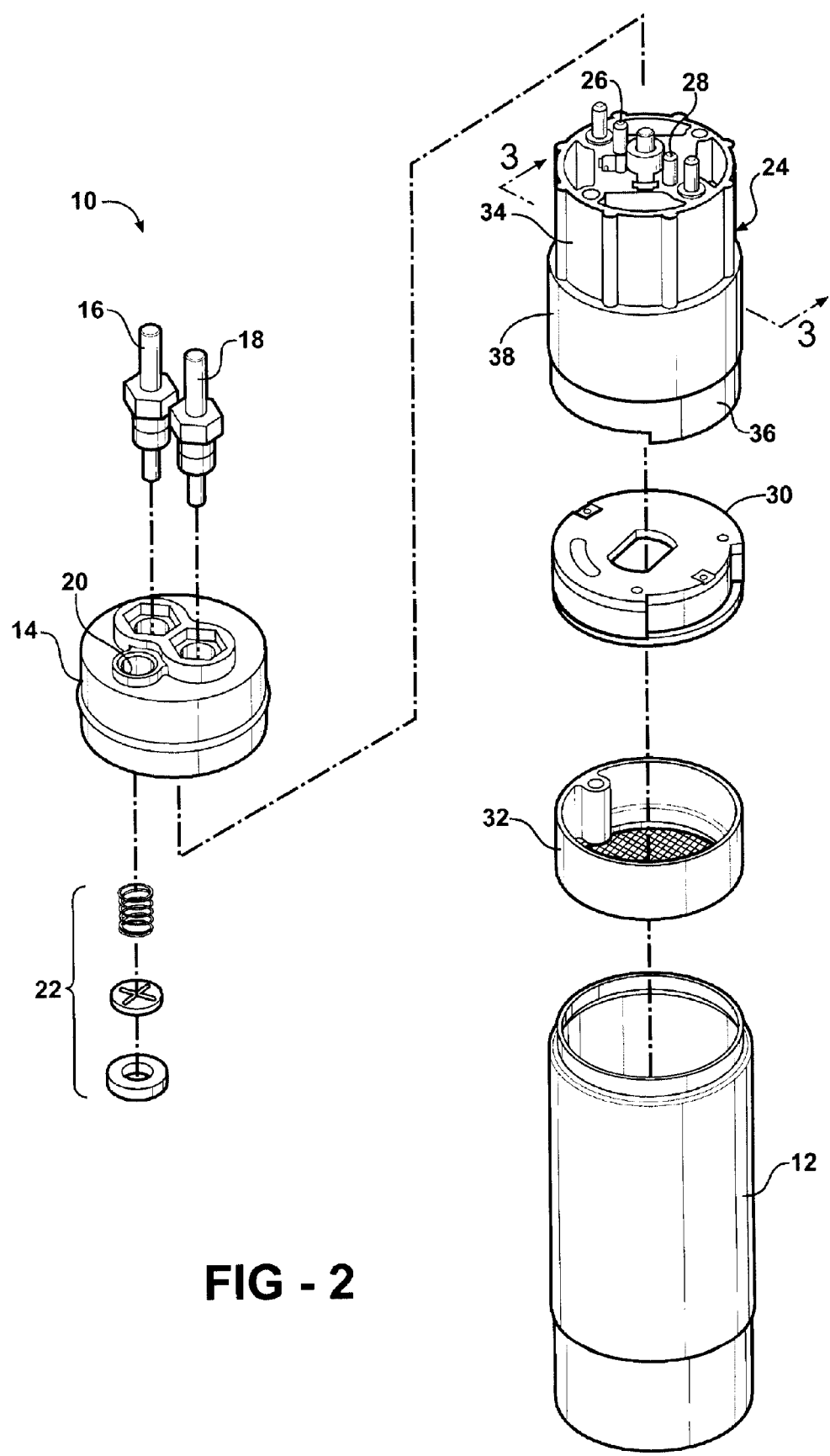
FIG. 2 is an exploded view of the fuel pump as depicted in FIG. 1, and illustrating a BLDC electric motor assembly contained within the fuel pump.

Referring now to FIG. 2, an exploded view of the pump 10 is depicted wherein various components internal to the housing 12 are shown individually. Check valve spring and components 22 are fitted into the underside of the outlet cap 14 in fluid communication with the outlet port 20. A BLDC motor assembly, generally indicated at 24, is also located directly beneath the outlet cap 14 with motor terminals 26, 28 ranged so as to electrically connect to the lower projecting ends of the terminals 16, 18 embedded in the housing cap 14.

A pumping section 30 is coupled to the lower end of the motor assembly 24. However, any other driven component or feature can be coupled to the motor assembly 24 instead of a pumping section 30, which is here described in the context of a fuel pump for illustrative purposes only. The pumping section 30 can be of the vane style, positive displacement style, roller style, or the like. A strainer 32 is seated below the pumping section 30 and forms an inlet to the fuel pump 10. Thus, in operation, the fuel pump 10 draws liquid fuel through the strainer 32 and, by driven force of the pumping section 30, forces the liquid fuel upwardly through the motor assembly 24 and through the outlet port 20 of the outlet cap 14.

Figure 3:
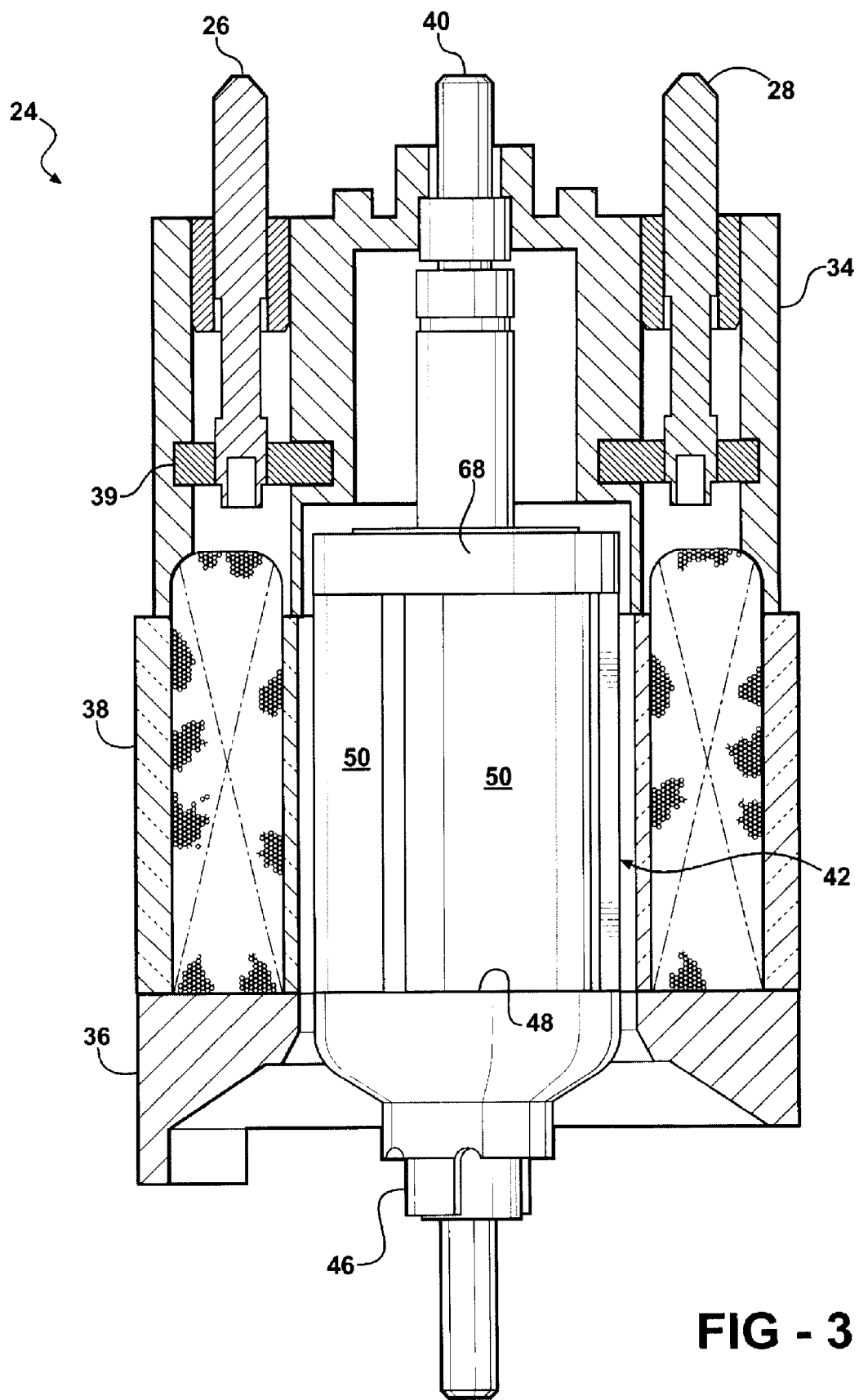
FIG. 3 is a cross-sectional view of a BLDC electric motor assembly according to the subject invention taken generally along lines 3-3 in FIG. 2.

FIG. 3 is a cross-sectional view through the BLDC motor assembly 24, as taken generally along lines 3-3 in FIG. 2. Here, the motor assembly 24 is shown including an upper housing portion 34 and a lower housing portion 36. Stack laminations comprising part of a stator 38 are captured between the upper 34 and lower 36 housing portions. The electric circuitry and controlling devices, including elements such as hall-effect sensors and Mos-fets (not shown) are contained on a circuit board 39 in the upper housing portion 34. The motor terminals 26, 28, shown in cross-section, are in electrical communication with the circuit board 39. A shaft 40 is supported for rotation at one end by the upper housing portion 34 and at its opposite lower end by the pumping section 30 (not shown) when the pumping section 30 is coupled to the lower housing portion 36 in an assembled condition. Bearings support the shaft 40 as needed.

The stator 38 includes the customary plate laminations and windings, and may be further powder coated for electrical insulation protection from the wires of the windings. The motor terminal 26, 28 are electrically connected to the stator 38 via appropriate connections through the circuit board 39. When energized, the stator 38 creates an electromagnetic field in the manner typical of BLDC motors.

Figure 4:
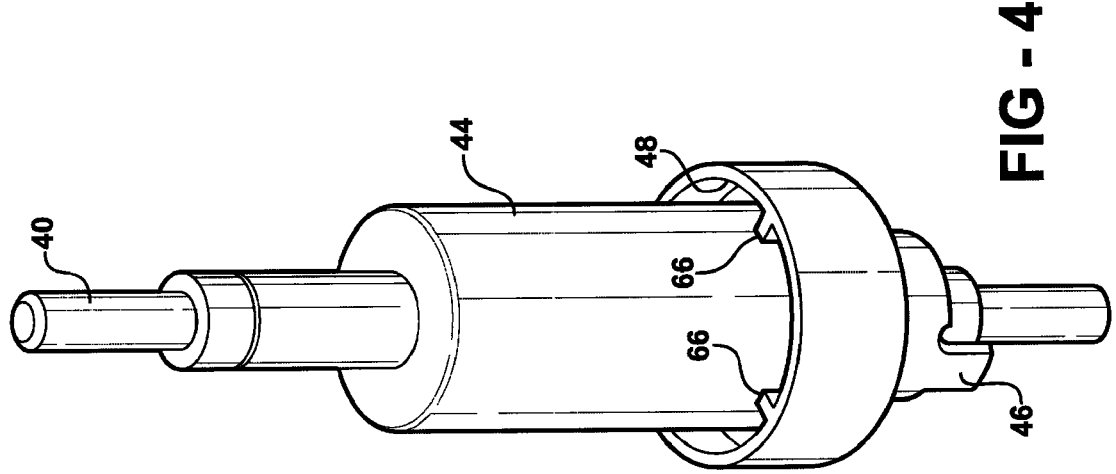
FIG. 4 is a perspective view of the rotary shaft and hub sections of a rotor for the BLDC electric motor assembly as depicted in FIG. 3.

A rotor 42 is operatively coupled to the shaft 40 and disposed for powered rotation within the stator 38 in response to the electromagnetic field generated by the stator 38. The rotor 42 may be fabricated according to the designs and techniques illustrated in FIGS. 4-9. FIG. 4, for example, illustrates the shaft 40 including, assembled thereon, a hub section 44. In one embodiment of the invention, both the shaft 40 and the hub 44 may be made of a stainless steel alloy. The hub 44 is fixed to the shaft 40 such that, when assembled, they comprise a unitary structure. The assembled shaft 40 and hub 44 are inserted into a plastic injection molding machine (not shown), so that a combined drive coupling 46 and retaining pocket 48 can be molded to the lower end of the hub 44 and about the shaft 40. The drive coupling 46 engages a complimentary drive socket in the pumping section 30. The retaining pocket 48, however, forms a receptacle for receiving a plurality of magnet segments 50 in a manner perhaps best depicted in FIG. 7.

In the preferred embodiment of this invention, four magnet segments 50 are employed, arranged side-by-side in equal arcuate increments about the hub 44. Thus, each magnet segment 50 spans approximately 90 degrees about the circumference of the rotor 42. It is not necessary that the plurality of magnet segments 50 be comprised of four segments only. The prior art has taught the use of less than four and more than four segments in other BLDC Motor constructions.

Figure 6:
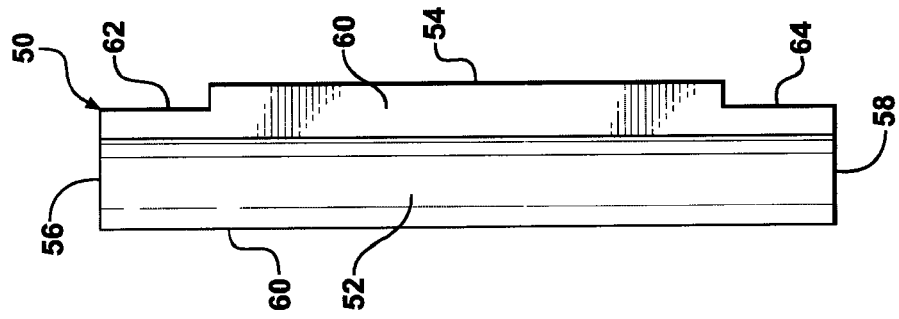
FIG. 6 is a side elevation of the magnet segment shown in FIG. 5.
Figure 5:
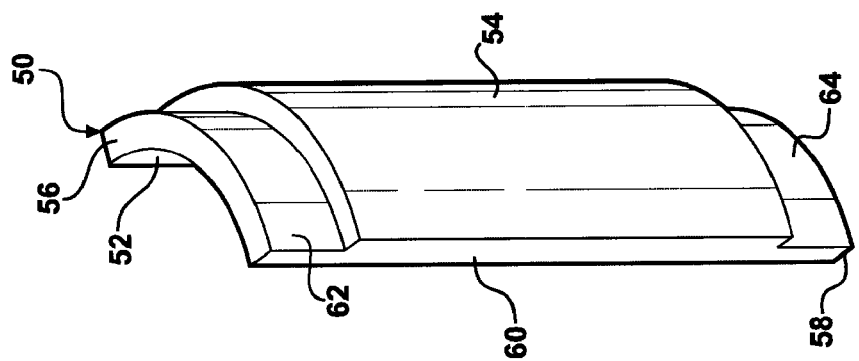
FIG. 5 is a perspective view of a permanent magnet segment of the subject invention.
Figure 7:
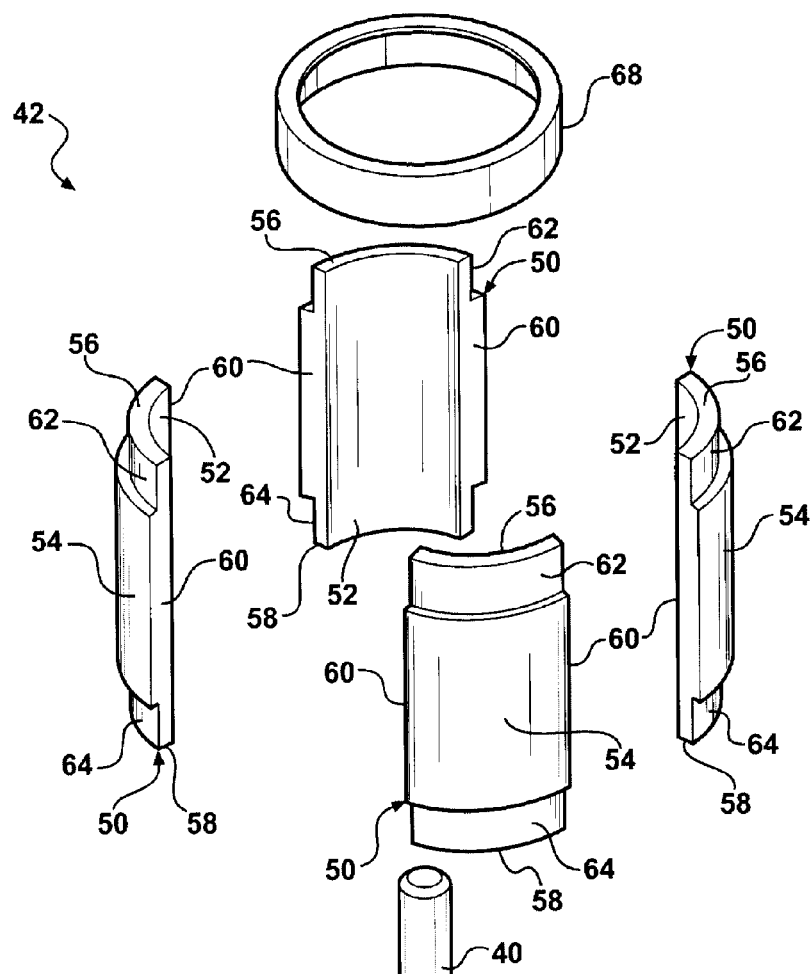
FIG. 7 is an exploded view of the rotor sub-assembly.
Figure 8:
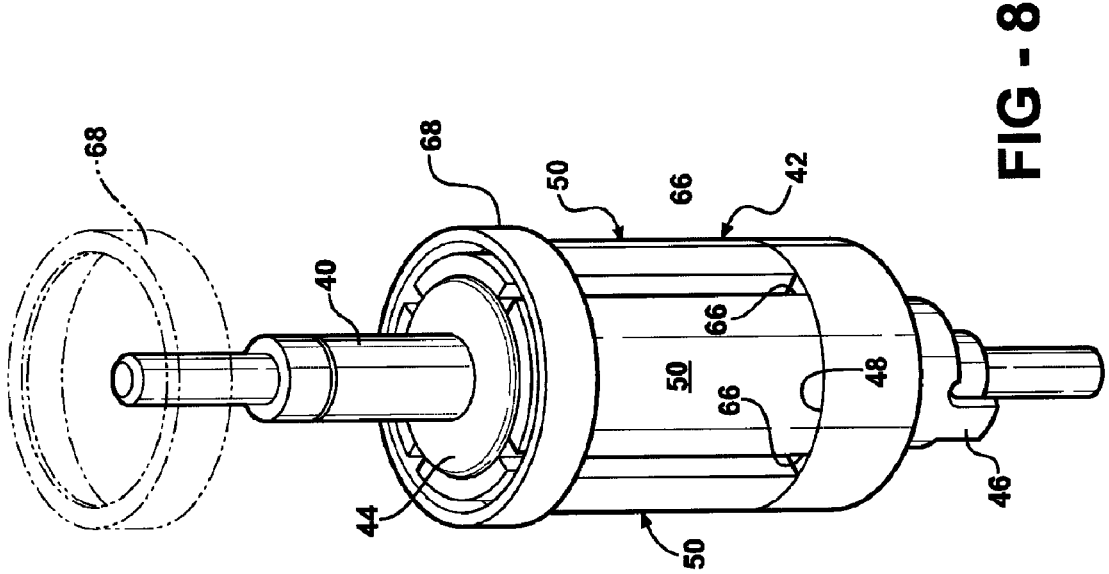
FIG. 8 is a perspective view of an assembled rotor for a BLDC electric motor assembly wherein the ring used to retain the upper end of the magnet segments is shown in exaggerated form loosely encircling the upper end of the magnet segments in solid lines, and the same ring is shown in a pre-assembly, exploded position in phantom.

As perhaps best shown in FIGS. 5 and 6, each magnet segment 50 includes a concave, semi-cylindrical inner surface 52. The inner surface 52 compliments the exterior surface of the hub 44. If in another embodiment, the exterior of the hub 44 presented a shape other than cylindrical, the inner surface 52 of the magnet segments 50 would be shaped for a mating fit. Each magnet segment 50 also includes a convex, semi-cylindrical outer surface 54. Opposing, generally parallel side edges 60 respectively extend between the upper 56 and lower 58 ends. Each magnet segment 50 is further fitted with a first tongue 62 adjacent the upper end 56 and a corresponding second tongue 64 adjacent its lower end 58. The first and second tongues 62, 64 each include semi-circular shoulders and convex, semi-cylindrical walls inset from the outer surface 54. The second tongue 64 is sized and shaped to seat in the retaining pocket 48 between anti-rotation lugs 66 formed radially inwardly therein. The second tongue 64 is thus dimensioned to slip into the retaining pocket 48 while its shoulder rests against the upper edge of retaining pocket 54, as illustrated in FIG. 8. Preferably, the outer dimension of the retainer pocket 48 is substantially equal to the outer dimension of the magnet segments 50 when seated in the operative position illustrated in FIG. 8, thus establishing a generally flush exterior of the rotor 42.

Figure 9:
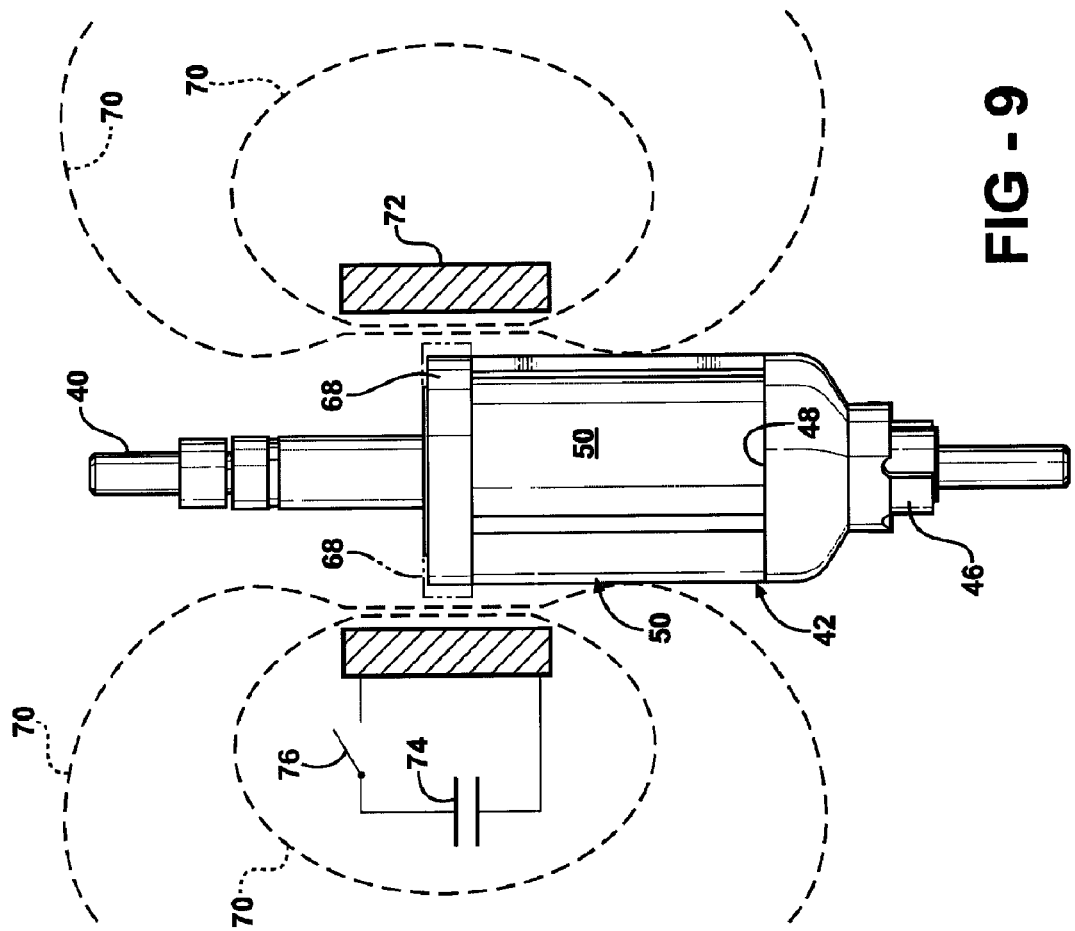
FIG. 9 is a simplified schematic view depicting a magnetic forming operation wherein the ring is rapidly shrunk under the influence of a high energy pulsed magnetic field as depicted by broken lines.

The magnet segments 50 are retained in their operative position, seated in the retaining pocket 48, through the use of an annular ring 68, as perhaps best shown in FIGS. 3, 8 and 9. The ring 68 is preferably made from a metal substance such as an aluminum or an alloy thereof, but can also be made from copper or any other electrically conductive material. The annular ring 68 is sized and shaped as a continuous, unbroken solid annular member which loosely encircles the first tongues 62 of the plurality of magnet segments 50 when assembled on the rotor 42 as shown in a highly exaggerated fashion in FIG. 8. The loosely installed ring 68, together with the other components of the assembled rotor 42, are then placed into an electromagnetic forming apparatus, where a high energy pulsed magnetic field is generated, as indicated by broken lines 70 in FIG. 9. The magnetic field 70 is created by a heavily constructed work coil 72. As is well known to those in the electromagnetic forming arts, a huge pulse of current is forced through the work coil 72 by rapidly discharging a high voltage capacitor bank 74 using an ignition or a spark gap as a switch 76. This creates a rapidly isolating, ultra strong electromagnetic field around the work coil 72. The high current in the work coil 72 (typically in the tens of thousands of amperes) creates ultra strong magnetic forces 70 that easily overcome the yield strength of the ring 68, causing near instantaneous permanent deformation. The forming process causes the ring 68 to shrink at high velocity. The rapidly shrinking ring 68 squeezes each magnet segment 50 into tight pressing engagement against the outer surface of the hub 44, thereby collectively holding all of the magnet segments 50 in their operative position upon the rotary shaft 40. This method of retaining the magnet segments 50 on the hub 44 is a reliable and inexpensive technique, which is conducive to use in high production environments. Preferably, the magnetic forming operations are controlled so that the ring 68 is shrunk only until the point where its outer circumferential edge is generally aligned with the outer surface of 54 of each magnet segment 50, as shown in FIG. 3, thereby providing a generally flush construction. The pre-formed size of the ring 68 is depicted in phantom in FIG. 9, with the post shrunk or final size of the ring 68 illustrated in solid lines in FIG. 9.

The electromagnetic forming operation is also beneficial in maintaining the balance of the rotor 42. That is, because separate fasteners and other discreet elements are not required to retain a magnet segments 50 in place, the rotational balance of the rotor 42 can better maintained using the ring 68. Because the invention does not require the use of any adhesive bonding agents to secure the magnet segments 50 in place, the resulting BLDC Motor assembly 24 is less prone to failure from delamination. Furthermore, the unique ring 68, which is set into the first tongue 62 so that it is flush with the outer surface 54 the arrayed magnet segments 50, does not obstruct the flow path of fuel as liquid is pumped through the interstitial space between the rotor 42 and the stator 38 in a fluid pumping application.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A brushless direct current (BLDC) electric motor assembly of the type used in liquid fuel pumps and the like, said motor assembly comprising:

a stator for producing a controlled electro-magnetic field, said stator defining a central longitudinal axis;

a shaft supported for rotation about said longitudinal axis, said shaft including a hub section having an outer surface;

a plurality of permanent magnet segments supported on said outer surface of said hub for co-rotation with said shaft, each of said magnet segments having opposite, longitudinally spaced ends, said magnet segments arranged side-by-side in equal arcuate increments around said hub;

an annular ring encircling at least one of said ends of said arrayed plurality of magnet segments, said ring having been deformed in an electromagnetic forming operation so as to exert a generally uniform compression on each of said magnet segments to hold said magnet segments in an operative position around said hub; and said hub section including an integral retaining pocket for receiving one of said longitudinally spaced ends of each of said magnets.

2. The assembly of claim 1 wherein said ring is fabricated from a metallic material.

3. The assembly of claim 2 wherein said ring is fabricated from aluminum or an alloy thereof.

4. The assembly of claim 1 wherein said retaining pocket includes anti-rotation lugs for preventing rotation of magnet segments relative to hub.

5. The assembly of claim 4 wherein each of said magnet segment includes a first tongue adjacent one of said longitudinally spaced ends for receiving said ring.

6. The assembly of claim 5 wherein each of said magnet segments includes a second tongue adjacent the other of said longitudinally spaced ends for seating in said retaining pocket.

7. The assembly of claim 1 further including a pump drive coupling integrally formed with said retaining pocket on said shaft.

8. The assembly of claim 1 wherein said ring is rotationally balanced about said longitudinal axis.

9. The assembly of claim 1 wherein each of said magnetic segments includes a convex, semi-cylindrical outer surface.

10. The assembly of claim 9 wherein said ring has an outer circumferential edge generally aligned flush with said outer surface of each of said magnet segments.

* * * * *